Aug. 17, 1943.   A. L. BROWN ET AL   2,326,748
POLYMERIZED INSULATING COMPOUND
Filed July 24, 1940
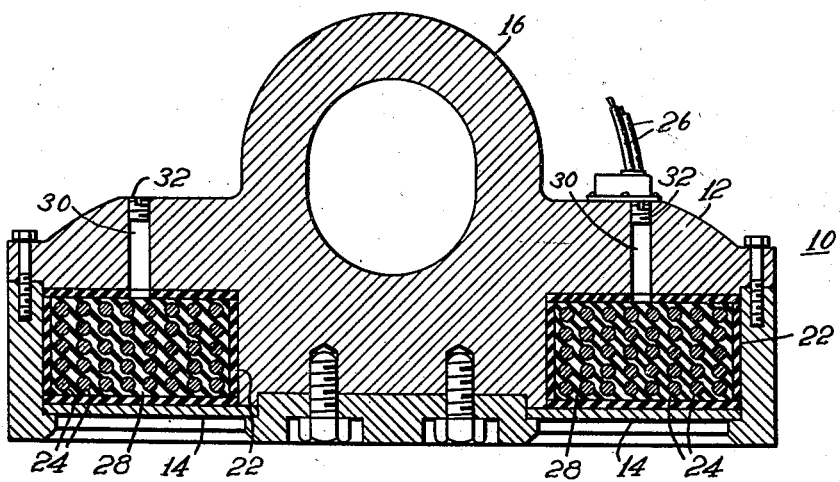
WITNESSES:
INVENTORS
Arthur L. Brown and
William B. Atkinson.
BY
ATTORNEY Patented Aug. 17, 1943

2,326,748

UNITED STATES PATENT OFFICE 2,326,748

POLYMERIZED INSULATING COMPOUND

Arthur L. Brown, Forest Hills, and William B. Atkinson, Pittsburgh, Pa., assignors to Westinghouse Electric & Manufacturing Company, East Pittsburgh, Pa., a corporation of Pennsylvania Application July 24, 1940, Serial No. 347,236

8 Claims. (Cl. 106—251)

This invention relates to a polymerized composition, particularly a polymerized oil suitable for use as an insulating composition for electrical apparatus.

The insulation of electrical elements within electrical apparatus calls for materials having good dielectric qualities and resistance to both ageing and deterioration due to the effects of temperature. In certain electrical apparatus, such, for example, as lifting electromagnets, the electrical insulation may be subjected to high temperatures for considerable lengths of time. Frequently hot billets and other ferrous materials must be handled with an electromagnet. Such use subjects the electrical insulation including an insulating composition filling to temperatures which will cause the electrical properties to be severely tested. Due to the fact that the amount of insulating filling material required for such apparatus is fairly large, ordinary high temperature insulation or inorganic insulating materials are not economically useable.

The problem of placing electrical insulating composition material in and around the electrical members of lifting electromagnets and similar apparatus is complicated due to the fact that the apparatus cannot be readily disassembled and an insulating composition filling applied under easily controllable conditions. At best a small filling opening is available through which the electrical insulation composition may be introduced into the apparatus. Entrapped air and voids are a common occurrence in the insulating composition heretofore employed.

It is a purpose of the invention to provide an electrical insulating composition employing polymerizable oils such as tung oil and oiticica oil which may be put into apparatus similar to the lifting electromagnet under conditions whereby good filling with substantially no voids is had and thereafter effecting a predetermined catalyzed polymerization of the oil to give a high grade electrical insulating solid which will withstand heat and other operating conditions with good results.

The object of this invention is to provide for controlled polymerization of tung oil and oiticica oils.

A further object of this invention is to provide for a stable catalytic solution for effecting a predetermined polymerization of oils.

The invention, accordingly, comprises the several steps and the relation and order of one or more of such steps with respect to each of the others and the article possessing the features, properties and the relation of the elements which are as provided in the following detailed disclosure and the scope of the application of which will be indicated in the claims.

For a fuller understanding of the nature and objects of the invention, reference may be had to the following detailed description taken in conjunction with the accompanying drawing, in which:

The single figure of drawing is a cross-sectional view of an electromagnet employing the insulating composition in accordance with this invention.

It has been known heretofore that tung oil may be polymerized and solidified by adding thereto certain metallic halogens, particularly the chlorides as polymerizing catalysts. However, the prior art catalytic polymerization is not readily controllable and the products obtained are not always uniformly solidified. In some instances when less than the required amount of the catalyst was added, heat was necessary in order to effect a more or less complete solidification of the tung oil. This was slow and costly.

Furthermore, the solidified tung oil produced by these prior art methods had poor electrical insulating characteristics. The power factor was exceedingly high, frequently over 15% as a lower limit. The solid resulting from the polymerization of the tung oil contained moisture or even hydrochloric acid, and had low electrical breakdown strength.

According to this invention polymerizable oils, such as tung oil and oiticica oil, are solidified by the application of a catalyst having properties which permits a predetermined rate and time of initiation of polymerization. In addition, the polymerization catalyst is stable and may be prepared prior to the time of use. The catalyst may be stored indefinitely and whenever required may be withdrawn from stock and applied to tung oil and oiticica oil to give a predetermined type of solidification product.

The basic materials which are to be polymerized to form the improved dielectric material of this invention are preferably tung oil and oiticica oil. These oils have very similar chemical and reaction properties and may be used independently or as mixtures, depending on the price and availability factors. The reaction product will be substantially similar in all cases. Other unsaturated oils of a similar nature which polymerize under the influence of a metallic chloride catalyst may be used in some instances.

The reaction product of polymerized tung oil or oiticica oil as resulting from this invention is a dark homogeneous elastic body. Blocks of this material may be bounced similarly to blocks of rubber. The mass has substantially no voids or gas pockets and is an ideal material for use as an electrical insulation.

The polymerization of tung and oiticica oils is effected by the use of a catalytic solution which affords a predetermined rate and time of initiation of the polymerization. The catalytic solution comprises a metallic halogen catalyst capable of polymerizing the tung and oiticica oils.

Numerous catalysts for this purpose are known, for example ferric chloride, ferric bromid, stannic chloride and other metallic halogen catalysts. These are known to the art and no exhaustive list thereof need be given. In order to provide for the best electrical properties of the final product, it is preferred to employ the anhydrous catalysts in preference to the hydrated metallic halogens. The electrical properties of the final product are greatly influenced by the presence of the water of hydration inasmuch as the catalyst remains thoroughly dispersed throughout the resulting polymerized solid product.

The application of the catalyst to tung and oiticica oils is carried out by means of a solvent for the metallic halogen. The direct application of a catalyst, such as ferric chloride, to tung oil results in an immediate and violent reaction which gives a clotted mass which is entirely unsuitable for most uses. When the ferric chloride catalyst is dissolved in a solvent, therefore, and applied to the polymerizable oil, the resulting product is a more homogeneous solid and physically is a considerable improvement.

The prior art has indicated that solvents similar to acetone are suitable solvents for ferric chloride. It has been discovered, however, that an acetone and ferric chloride catalytic solution is unsuitable for the polymerization of the oil to produce a good dielectric product. The power factor even under the best of conditions is over 15%. Acetone contains quantities of water which are extremely difficult to eliminate and the water will remain within the final polymerization product.

It has been found that for electrical insulation products only a few solvents for ferric chloride will give good results. In particular, it has been found that tricresyl phosphate has superior characteristics which render its use highly advantageous in the preparation of a catalytic solution for polymerizing tung and oiticica oils. The boiling point of ortho-tricresyl phosphate is 350° C. Inasmuch as the solvent remains present in the polymerized mass substantially without solidifying or reacting therewith the advantages of a high boiling point solvent especially for high temperature operating conditions are obvious. Tricresyl phosphate is readily available with substantially no water present and therefore moisture in the polymerized dielectric solid is avoided by use thereof.

A tricresyl phosphate-ferric chloride catalytic solution is exceedingly stable and may be stored indefinitely without deterioration. Tricresyl phosphate dissolves ferric chloride with a low heat of solution. Acetone, ether and other prior art solvents must be artificially cooled during the dissolution of the ferric chloride in order to prevent boiling over of the solvent. In addition, tricresyl phosphate is substantially non-combustible and does not create a fire or health hazard when used according to this invention.

Tricresyl phosphate is available in the ortho, meta and para isomers. Tri-ortho-cresyl phosphate has been employed satisfactorily as a solvent. It is commercially available at low cost. The tri-meta-cresyl phosphate is quite similar in its properties to the ortho isomer, but is more expensive. The tri-para-cresyl phosphate is a solid at room temperature, melting at 76 to 78° C. Under some conditions the para isomer can be used, but it entails the handling of quite hot solutions which is an operating disadvantage. The technical grade of ortho phosphate has been successfully made use of. It is believed that small amounts of the para and meta phosphate are present in the technical grade of ortho, and it is intended that such a mixture be included in the term tricresyl phosphate wherever it appears.

While tricresyl phosphate is intended to be the preferred solvent for the metallic halogen catalyst, other solvents are not necessarily excluded. For example, methyl isobutyl ketone and methyl n-amyl ketone are solvents which may be used for putting the halogen catalyst into solution. The prime requirement for these solvents is that they be substantially anhydrous in order that the electrical properties of the polymerized oil be kept at a high level.

The solution of the metallic halogen catalyst for the polymerization of tung and oiticica oil may be modified by the addition of a deterrent in order to impart a predetermined time and rate of initiation of polymerization. It has been discovered that castor oil may be added to the catalyst solution in order to achieve a control of the time of initiation and the rate of polymerization. The solution of the metallic halogen which gives the best physical properties in the polymerized product reacts so rapidly under ordinary conditions that the application of the tung and oiticica oil to apparatus is attended with great operating difficulties. The addition of the castor oil deterrent to the catalyst solution imparts predetermined controllability to the polymerization reaction. The amount of castor oil or deterrent in the catalytic solution should exceed the quantity of ferric chloride to effect controlled polymerization.

The deterring action of the castor oil is distinct from the so-called "indifferent" oils. Various indifferent oils have been experimentally tried out and their effect appears to be radically different than that of the castor oil deterrent. The castor oil produces a true deterrent reaction on catalysis, the indifferent oils appear to be simply in the nature of diluents.

The preparation of a catalytic solution of the above-named three ingredients suitable for polymerizing 100 pounds of tung and oiticica oil to give a solid having excellent dielectric qualities and good mechanical properties is as follows. The amount of anhydrous ferric chloride may range from 0.8 to 1½ pounds. For the above amount of tung oil, a preferred quantity of catalyst is 1.1 pounds of anhydrous ferric chloride. In some instances the amount of ferric chloride per hundred pounds of polymerizable oil may be varied slightly from the above range but it is believed that the above range gives the best final product.

The amount of tricresyl phosphate solvent for the above quantities of anhydrous ferric chloride may vary from 2 to 5 pounds, proportional to the amount of ferric chloride to be put into solution. The preferred quantity, however, is 3 pounds tricresyl phosphate for 1.1 pounds of ferric chloride. An excess of tricresyl phosphate is of no definite advantage inasmuch as its presence does not add to the mechanical or electrical characteristics of the polymerized material. The ferric chloride and tricresyl phosphate may be simply stirred together. The heat of solution raises the temperature to about 60° C. This slight rise of temperature during effecting solution is an operational feature which is advantageous as compared to other solvents for ferric chloride. For example, ether must be cooled with ice and the introduction of ferric chloride effected very slowly in order to prevent violent ebullition and evaporation of the ether.

Thereafter from 15 to 25 pounds of castor oil are added to the above tricresyl phosphate-ferric chloride solution. The castor oil should be substantially free of water. A preferred quantity of castor oil is 18 pounds of castor oil for 1.1 pounds of ferric chloride. The quantity of castor oil cannot be greatly reduced below 15 pounds for 1.1 pounds of ferric chloride without greatly reducing the time available before initiation of the polymerization reaction. An excess of castor oil above 25 pounds is undesirable if an elastic and strong solid of polymerized oil is desired. Castor oil in excess quantities acts as a flexibilizer and produces a somewhat tacky or soft mass.

The catalytic solution comprising ferric chloride, tricresyl phosphate and the deterrent may be prepared and stored indefinitely. The catalytic solution is substantially non-ageing and it may be used months later as effectively as fresh material. This non-ageing feature is a considerable advance over the prior art. Ferric chloride, acetone and castor oil solutions, for example, are unstable and have to be used within a day or so.

The catalytic solution comprises substantially anhydrous components. Since about 22 pounds of this catalytic solution are present per 100 pounds of polymerizable oil, the presence of even small proportions of water would be detrimental to the electrical properties. However, minute amounts of moisture may be advantitiously present without a great loss in dielectric properties.

A convenient method of measuring the several constituents is to use 5 gallons of tung or oiticica oil to 1 gallon of catalyst solution.

The above quantity of catalytic solution may be added to 100 pounds of tung or oiticica oil or a mixture thereof and stirred thoroughly in a receptacle for about 5 minutes. When thorough dispersion of the catalytic solution in the polymerizable oil has been effected, the mixture may be poured into electrical apparatus or into molds for forming the shape of the solid insulation product desired. In order to effect thorough impregnation of electrical insulation and the filling of voids without producing air pockets, the solution should be poured within 15 minutes on a hot day and a half an hour or so on a cold day, since the oil begins to thicken within this time.

Referring to the single figure of the drawing there is illustrated a cross section of an electromagnet filled with the polymerized oil solid insulation. The electromagnet 10 comprises a main magnetic iron casing 12 and a sole plate 14 of non-magnetic material, for example, 12% manganese steel. The electromagnet may be conventionally suspended from a hoisting mechanism by means of an eye 16. Within the body of the casing 12 is an annular cavity 22. Within this annular cavity conductors 24 are disposed forming the electromagnetic winding. The conductors 24 may be connected by means of conductors 26 to a switch (not shown) under the control of the hoist operator. The conductors 24 may be energized and deenergized at the will of the operator. The conductors 24 are insulated from each other and from the iron casing 12 by the dielectric composition 28 of polymerized oil as hereinbefore described.

The number of turns of conductors 24 employed will depend on the predetermined capacity of the electromagnet. The sole plate 14 is affixed to the casing and the annular cavity 22 is substantially closed. A filling aperture 30 in the top of the casing 12 is provided for the introduction of the insulating composition.

Commercial electromagnets have cavities which take as much as 12 gallons of insulating composition. To fill an electromagnet of this size requires a mixture of about 10 gallons of tung oil and/or oiticica oil and 2 gallons of the catalytic solution prepared as above indicated. The oil and catalytic solution are mixed together for about 5 minutes in a container and the composition is poured by means of buckets and funnels or a hose from the container through the aperture 30. The composition is a thin fluid which readily flows in and about the conductors 24, filling the cavity 22 completely in a few minutes. After the entire cavity 22 has been filled, the composition will begin to gel within 20 minutes to 40 minutes depending on the temperature. It is customary to let the electromagnet rest over night before using in order to permit the complete polymerization of the oil. The plug 32 may be placed into aperture 30 immediately after filling in order to prevent entry of moisture.

The solidified polymerized composition will withstand temperatures of 150° C. for 5 or 6 hours without any noticeable change in properties except for a slight superficial hardening of surfaces exposed to the atmosphere. The interior of a mass exposed to the air at such temperature does not noticeably change its properties. The composition has been subjected to a temperature of 110° C. for several days without any noticeable change whatever in its mechanical properties. Accordingly the composition is highly desirable for applications where such temperatures are apt to occur.

In some instances the tung oil and oiticica oil may be modified by additions of up to 25% by weight of the oil of ester gum, stearine or petroleum pitch. The viscosity of the tung oil is greatly increased by the addition of such fillers and for filling purposes such as the electromagnet application above described the increase in viscosity may be a factor to consider. However, the addition of petroleum pitch, for example, imparts somewhat improved electrical properties and the polymerized compound itself is both stronger and more resilient than when tung oil alone is used.

The electrical insulating properties of a tung oil solid prepared with the tricresyl phosphate catalytic solution is indicated by the following table:

*Resistivity*

| Temp. ° C. | Volts D. C. | Megohms |
|---|---|---|
| 27.5 | 2,000 | 1,565,000 |
| 27.5 | 2,500 | 1,345,000 |
| 99 | 2,000 | 10,850 |
| 99 | 2,500 | 10,250 |

*Power factor*

| Temp. ° C. | Volts A. C. | Power factor |
|---|---|---|
| 27.5 | 1,000—60 cycle | 4.4 |
| 27.5 | 2,000—60 cycle | 4.6 |
| 99 | 1,000—60 cycle | 18.2 |
| 99 | 2,000—60 cycle | 18.8 |

The above tables of electrical properties set forth a remarkable improvement over the electrical properties of tung oil polymerized with acetone or amyl acetate solutions of ferric chloride.

Numerous applications are possible for the polymerizable composition according to this invention. The filling of small portable transformers and the application of the composition to capacitors, outlet boxes and other electrical equipment are some possible uses to which this material may be advantageously applied.

It should be noted that only a few pieces of the very simplest of equipment are necessary for producing the polymerized tung and oiticica oil solid. In addition the catalyst is effective without heating. The prior art polymerization required furnaces for causing the polymerization to go to completion along with the use of catalysts.

The controlled polymerization according to this invention occurs within a short period of time and the apparatus being insulated therewith may be put in use several days sooner than it would be if treated as heretofore known. Furthermore, the final insulating product is electrically and mechanically greatly superior.

Since certain obvious changes may be made in the above procedure and different embodiments of the invention could be made without departing from the scope thereof, it is intended that all matter contained in the above description and drawing shall be taken in connection with the accompanying claims and not in a limiting sense.

We claim as our invention:

1. A composition of matter comprising at least one polymerizable oil selected from the group consisting of tung oil and oiticica oil, and an anhydrous catalytic solution for effecting polymerization of the oil, the anhydrous catalytic solution composed of an anhydrous metal halide catalyst for polymerizing the oil, a high boiling point, an anhydrous solvent for dissolving the anhydrous metal halide catalyst and a deterrent in the catalytic solution for modifying the action of the catalyst in order to provide for a controlled rate and time of initiation of the polymerization, the deterrent consisting of castor oil in an amount greater than that of the catalyst.

2. A composition of matter comprising at least one polymerizable oil selected from the group consisting of tung oil and oiticica oil, an anhydrous catalytic solution for effecting polymerization of the oil, the catalytic solution composed of an anhydrous metal halide catalyst capable of polymerizing the oil, a high boiling point, anhydrous solvent for dissolving the anhydrous metal halide catalyst and a deterrent for modifying the action of the catalyst in order to provide for a predetermined rate and time of initiation of polymerization, the deterrent consisting of castor oil in an amount greater than that of the anhydrous metal halide catalyst, and an admixture of up to 25% of the polymerizable oil of a hardening filler of the nature of petroleum pitch, the whole being combined and polymerized to provide a substantially homogeneous solid having good dielectric properties.

3. A composition of matter suitable for effecting controlled catalytic polymerization of tung and oiticica oils, comprising an anhydrous metal halide catalyst, anhydrous tricresyl phosphate for dissolving the catalyst and a deterrent exceeding the quantity of catalyst present for controlling the rate and time of polymerization, the deterrent comprising castor oil.

4. A composition of matter suitable for electrical insulation comprising, in combination, polymerized oil selected from one or more of tung oil and oiticica oil, an anhydrous metal halide catalyst for effecting polymerization of the tung oil, substantially anhydrous tricresyl phosphate for dissolving the catalyst and a deterrent providing for a predetermined rate and time of polymerization of the oil, the deterrent comprising castor oil, the composition having good dieelectric properties.

5. A resin suitable for electrical insulating comprising a polymerizable oil selected from the group consisting of tung oil and oiticica oil, anhydrous ferric chloride, tricresyl phosphate and castor oil, the whole being polymerized into a solid having good dielectric properties.

6. An electrically insulating composition comprising 100 parts of a polymerizing oil selected from the group consisting of oiticica oil and tung oil, an anhydrous catalyst solution for polymerizing the oil, the catalyst solution composed of 0.8 to 1½ parts of anhydrous ferric chloride dissolved in 2 to 5 parts of tricresyl phosphate and a deterrent comprising 15 to 25 parts of castor oil, the deterrent retarding the polymerization to provide for a thorough combination of the whole and providing for a controlled rate and time of initiation of the polymerization, the polymerized composition yielding an elastic solid having good dielectric properties.

7. A molded elastic solid having good dielectric properties, the solid comprising a polymerized oil selected from the group consisting of oiticica oil and tung oil and an anhydrous catalytic solution for causing a predetermined rate and time of initiation of polymerization of the oil, the anhydrous catalytic solution composed of anhydrous ferric chloride catalyst, anhydrous tricresyl phosphate as a solvent for the ferric chloride and a deterrent composed of castor oil, the amount of castor oil exceeding the amount of the ferric chloride.

8. The method of obtaining a molded elastic solid, having good dielectric properties, from an oil selected from the group of tung oil and oiticica oil, which comprises adding to an anhydrous ferric chloride catalyst for causing polymerization of the oil, a quantity of deterrent exceeding the quantity of the ferric chloride, the deterrent comprising castor oil.

ARTHUR L. BROWN.
WILLIAM B. ATKINSON.